(12) United States Patent
Wong

(10) Patent No.: US 10,780,486 B1
(45) Date of Patent: Sep. 22, 2020

(54) NOTCHER

(71) Applicant: Valtra Inc., Santa Fe Springs, CA (US)

(72) Inventor: Harry Wong, Pasadena, CA (US)

(73) Assignee: Valtra Inc., Santa Fe Springs, CA (US)

( * ) Notice: Subject to any disclaimer, the term of this patent is extended or adjusted under 35 U.S.C. 154(b) by 0 days.

(21) Appl. No.: 16/534,628

(22) Filed: Aug. 7, 2019

(51) Int. Cl.
*B21D 28/02* (2006.01)
*B21D 28/24* (2006.01)
*B21D 28/12* (2006.01)

(52) U.S. Cl.
CPC ............ *B21D 28/02* (2013.01); *B21D 28/24* (2013.01); *B21D 28/12* (2013.01); *Y10T 83/0596* (2015.04)

(58) Field of Classification Search
CPC ............ Y10T 83/829; Y10T 83/0596; Y10T 83/7487; Y10T 83/7493; Y10T 83/7507; Y10T 83/7513; Y10T 408/561; Y10T 408/5612; Y10T 408/5614; Y10T 408/5616; Y10T 408/5617; Y10T 408/563; Y10T 408/567; Y10T 408/94; Y10T 408/95; B21D 28/02; B21D 28/04; B21D 28/12; B21D 28/28; B21D 28/30; B21D 28/32
See application file for complete search history.

(56) References Cited

U.S. PATENT DOCUMENTS

| | | | | |
|---|---|---|---|---|
| 7,607,870 B2 * | 10/2009 | Hughes, Jr. | ........... | B23B 41/003 408/103 |
| 8,616,811 B2 * | 12/2013 | Clark, II | ............... | B23B 47/281 408/115 R |
| 2009/0022559 A1 * | 1/2009 | Hughes, Jr. | .............. | B25H 1/00 408/103 |
| 2012/0243954 A1 * | 9/2012 | Rusch | ...................... | B25B 5/08 408/103 |

* cited by examiner

*Primary Examiner* — Phong H Nguyen
(74) *Attorney, Agent, or Firm* — Jen-Feng Lee, Esq.

(57) ABSTRACT

Present invention teaches a notcher having primary structures of a base plate with a mounting plate set in a vertical orientation. A square plate carries a pivotable trapezoidal plate that carries the notcher assembly. The square plate is slidably connected to said mounting plate wedges on the square plate where those wedges match to v-grooves on the side of the mounting plate. A T-post clamp serves to provide the holding structure to hold work pieces in place for the notcher assembly to do the needed work of cutting/notching out a hole.

6 Claims, 7 Drawing Sheets

NOTCHER

FIELD AND BACKGROUND OF THE INVENTION

Present invention disclosed a notcher for cutting, sawing or notching a hole on a work piece with high level of flexibility in location and angle adjustment.

Particularly if the work piece is a tube-like structure, whether it is the more commonly found round or square shapes, or other irregular shapes, the present invention allows easy and flexible set up to hold such a work piece for a hole to be made easily.

An accessory item of T-post clamp serves to work with the main notcher unit to hold work pieces securely in place. The clamp contains magnetic pad that provides better holding power in the case where the work piece may be magnetic as well.

SUMMARY OF THE INVENTION

The invention relates to a notcher having primary structures of a base plate with a mounting plate set in a vertical orientation. A square plate carries a pivotable trapezoidal plate that in turn carries the notcher assembly.

A plurality of tooling holes exists on both the base plate and the mounting plate. At one side of the mounting plate, two v-grooves are formed.

A square plate is slidably connected to said mounting plate via said v-grooves. The square plate has a long gap with an opening flanked by two wedges that match with, or are coupled to, the two v-grooves of the mounting plate. The wedges matching to, or coupling to, the v-grooves is best shown in a top-down view in FIG. 1a.

A horizontal tightening screw serves to tighten the two wedges to the two v-grooves by making the long gap closer (thus tightening) or wider (thus loosening up the two wedges relative to the two v-grooves), allowing the adjustment of the vertical position of the square plate to be made.

The trapezoidal plate can turn its angle relative to the square plate by hinge-rotating about an angle screw.

A notching tool assembly is fixed to said trapezoidal plate. The notcher tool assembly further comprised of a shaft held in a through hole in a block. A notcher head can be installed at one end of said shaft.

In actual use, the base plate and the bottom of said height screw will be sitting on the surface of a work table, while the height screw adjusts the height of the square plate, which carries the trapezoidal plate, which in turn carries the notcher tool assembly.

A power tool, or other type of rotary power source, can be attached to one end of the notcher assembly to provide the rotating power needed for the notcher assembly, particularly the notcher head to work.

A T-post clamp is an accessory component to work with the main notcher setup. The T-post clamp will hold a work piece in place, relative to the position/angle of the notcher as set by a user, for the hole to be cut/sawed by the notcher.

DESCRIPTION OF THE DRAWINGS

The accompanying drawings exemplify the preferred embodiments of the invention. Together with the description, serve to explain the principles of the invention.

A brief description of the drawings is as follows.

DETAILED DESCRIPTION OF THE PREFERRED EMBODIMENT

The notcher of present invention is primarily composed of a rectangular base plate 1 and a rectangular mounting plate 2 attached vertically to the base plate 1.

Figure 1:
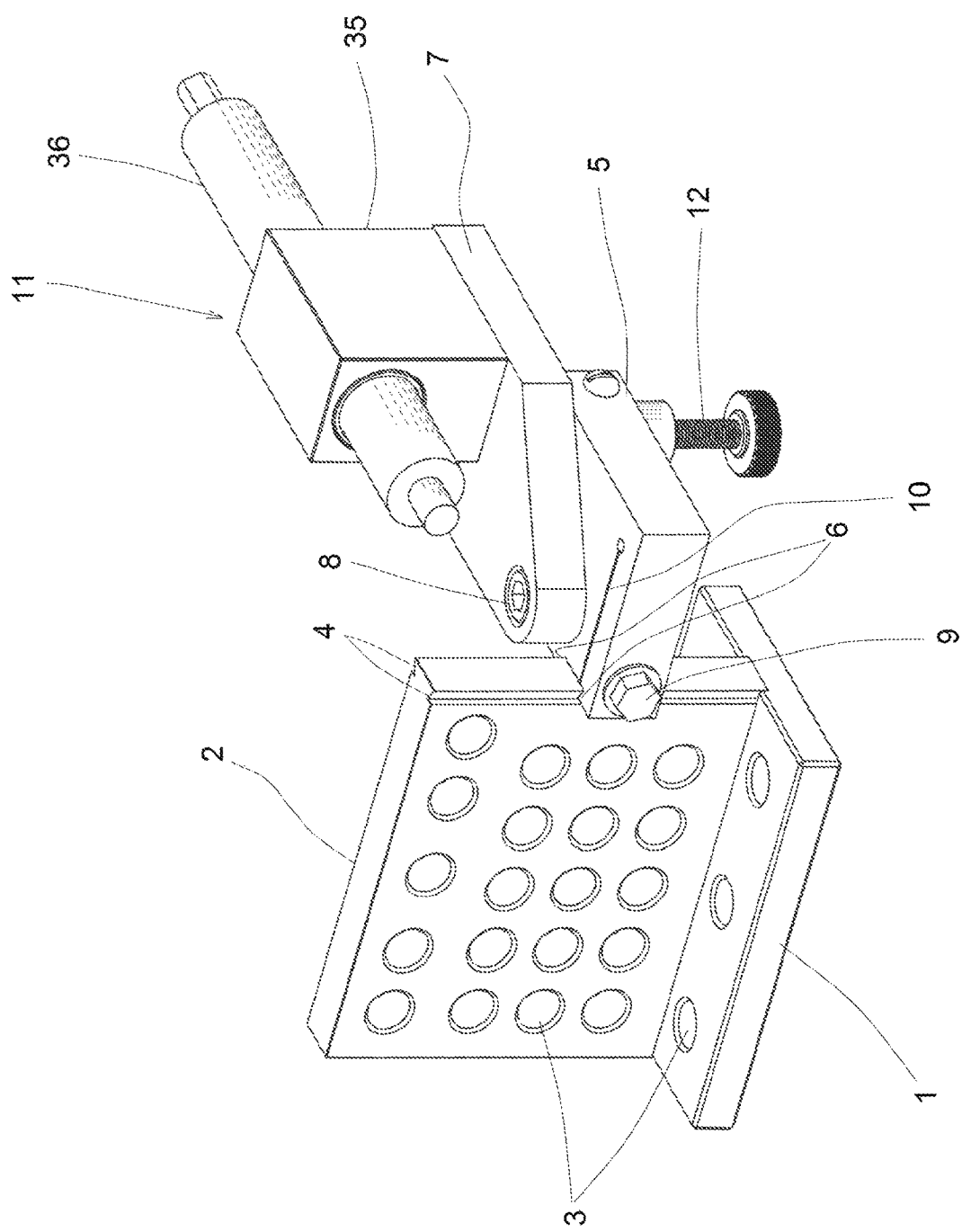
FIG. 1 is the perspective view of the primary structures of present invention.

As shown in FIG. 1, a plurality of tooling holes 3 exists on both the base plate 1 and the mounting plate 2.

At one side of the mounting plate 2, two v-grooves 4 are formed, as shown in FIG. 1. Vertical top-down view of the v-grooves 4 is presented in FIG. 1a.

A square plate 5 is slidably connected to said mounting plate 2 via said v-grooves 4. The square plate 5 has a long gap 10 with an opening flanked by two wedges 6 that match with (coupled to) the two v-grooves 4 of the mounting plate 2.

Figure 1A:
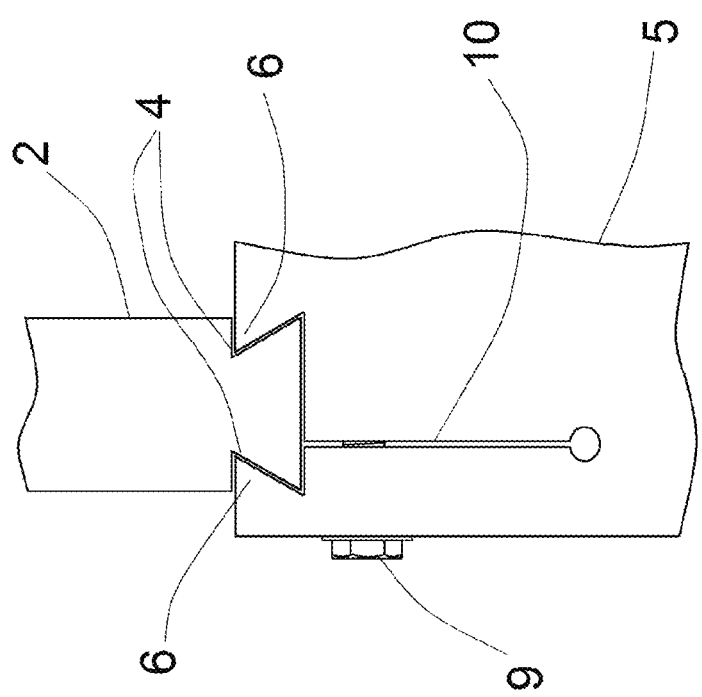
FIG. 1a is a top-down view of the square plate showing the opening and the wedges matching/coupling to the v-grooves of the mounting plate.

The wedges 6 of the square plate 5 coupling to the v-grooves 4 is best shown in a top-down view in FIG. 1a. A horizontal tightening screw 9 can adjust the width of the gap 10 and serves to tighten the two wedges 6 to the two v-grooves 4 when a desired height of the square plate 5 is set. When the long gap 10 is made to be closer (thus tightening), the two wedges 6 are then tightened to the two v-grooves 4, setting the height of the square plate 5 in a desired point. When the long gap 10 is made to be wider, the two wedges 6 are not coupled to the two v-grooves 4, allowing the adjustment of the vertical position of the square plate 5 to be made.

Figure 5:
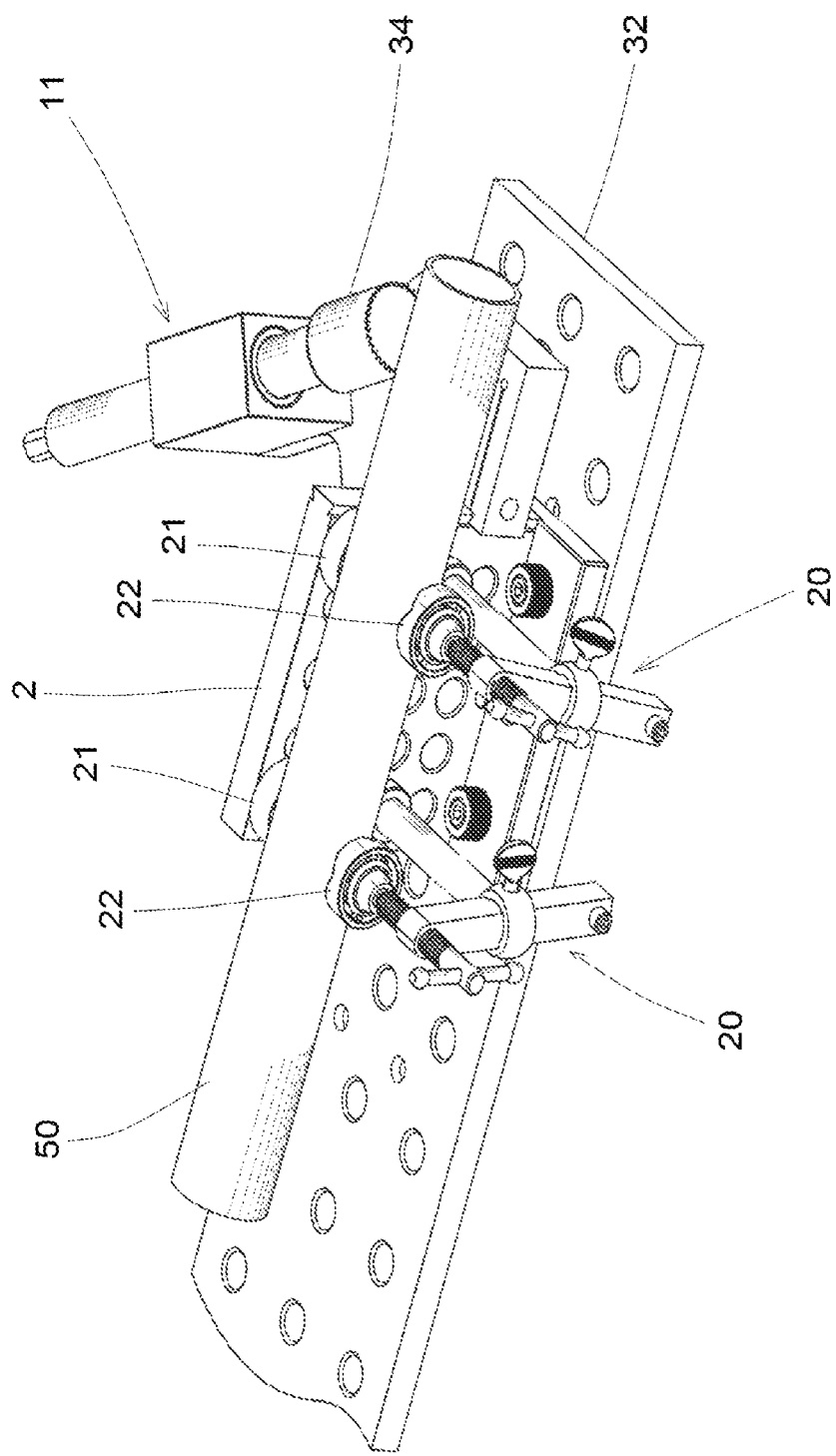
FIG. 5 shows the notcher being set up at an angle different from that of FIG. 4.

A trapezoidal plate 7 is hingeably connected to said square plate 5 via an angle screw 8. As such, the trapezoidal plate 7 can turn its angle relative to the square plate 5 by the hinge-rotation about the angle screw 8. FIG. 5 shows the trapezoidal plate is turned to a different angle than that in FIG. 1.

A notching tool assembly 11 is fixed to said trapezoidal plate 7. A height screw 12 attached to said square plate 5, specifically at the underside of the square plate 5, for adjusting the height of the notching tool assembly 11. The notcher tool assembly 11 further comprised of a shaft 36 held in a through hole in a block 35. A notcher head 34 can be installed at one end of said shaft 36.

The height screw 12 also serves an important function to stabilize the notching tool assembly 11 during the notching process, minimizing the vibration caused by the cutting (or drilling, whatever the intended function is).

When set up for use, the notcher head 34 can be any kind of cutting/drilling tool similar to different type of drill bits (or saws) that can be installed at one end of said shaft 36, whereas the other end of shaft 36 can be connected to a power source, to produce the desired rotation or other movement to effectuate the goal of notching or cutting a hole on a work piece.

In actual use, the base plate 1 and the bottom of said height screw 12 will be sitting on the surface of a work table 32, while the height screw 12 adjusts the height of the square plate 5, which carries the trapezoidal plate 7, which in turn carries the notcher tool assembly 11.

Figure 2:
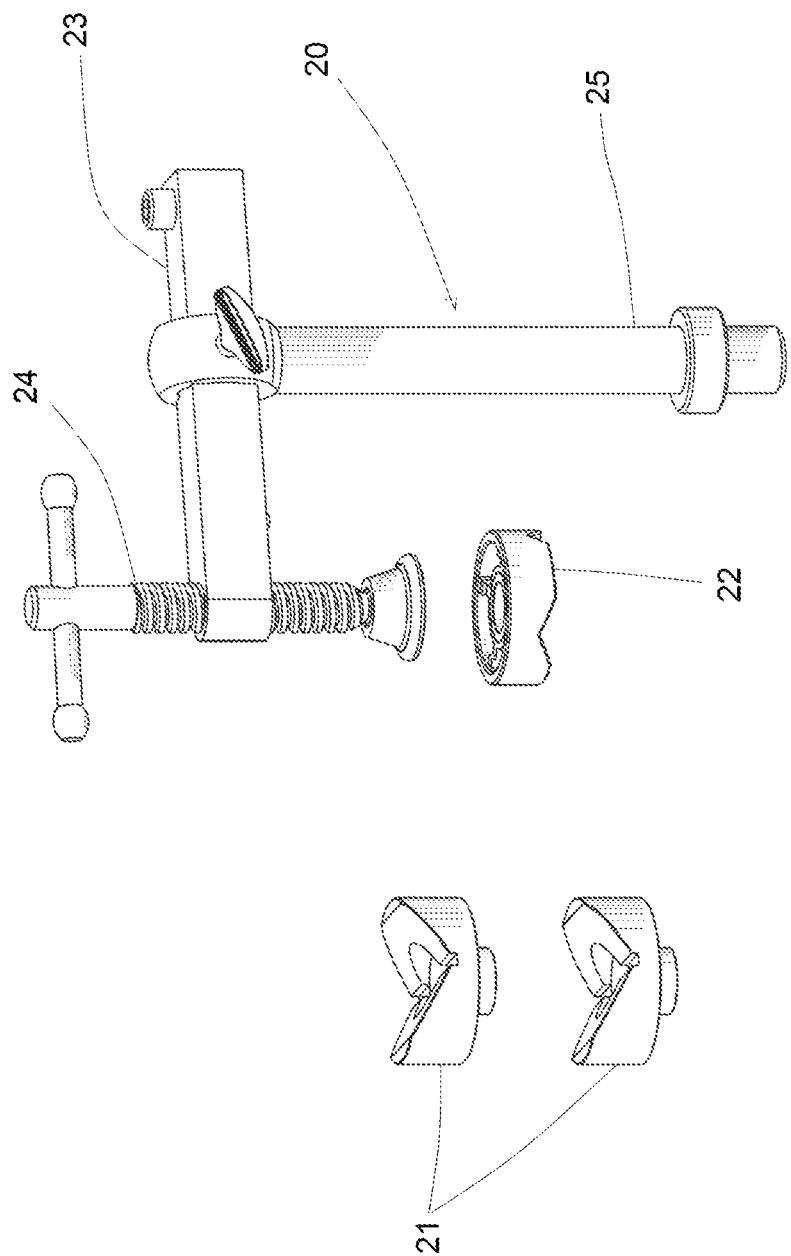
FIG. 2 shows the accessory component of the T-post clamp.

A T-post clamp 20 is shown in FIG. 2. T-post clamp 20 is an accessory component to work with the main notcher setup as described herein. This T-post clamp 20 provides the flexibility for the notcher to work on work pieces of different shapes and sizes.

The T-post clamp 20 has a shank 25, a clamp arm 23 slidably fitted through an end-hole of said shank 25, and a T-handle 24 slidably fitted through a threaded hole of said clamp arm 23.

The T-handle 24 has a magnetic pad 22 for contacting a work piece; even if a work piece is not magnetic, the magnetic pad 22 has indented carvings, or notches, for better contacting a work piece that may have a curved surface, as can be seen in FIG. 5 where a round tube is being held.

Figure 3:
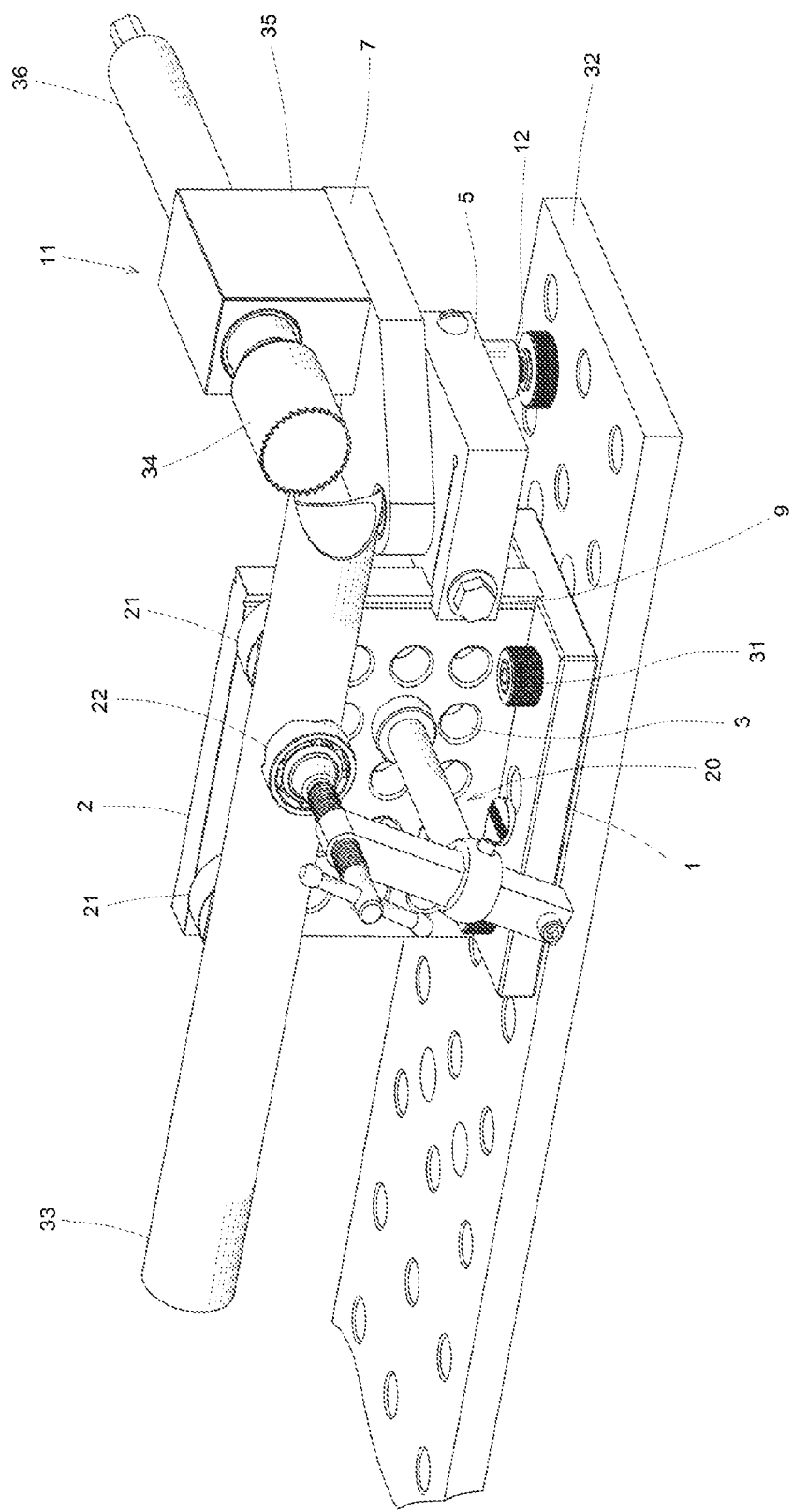
FIG. 3 shows a round tube being held by the T-post clamp for the notcher to make a cut (a notch) at a distal end of the round tube.
Figure 4:
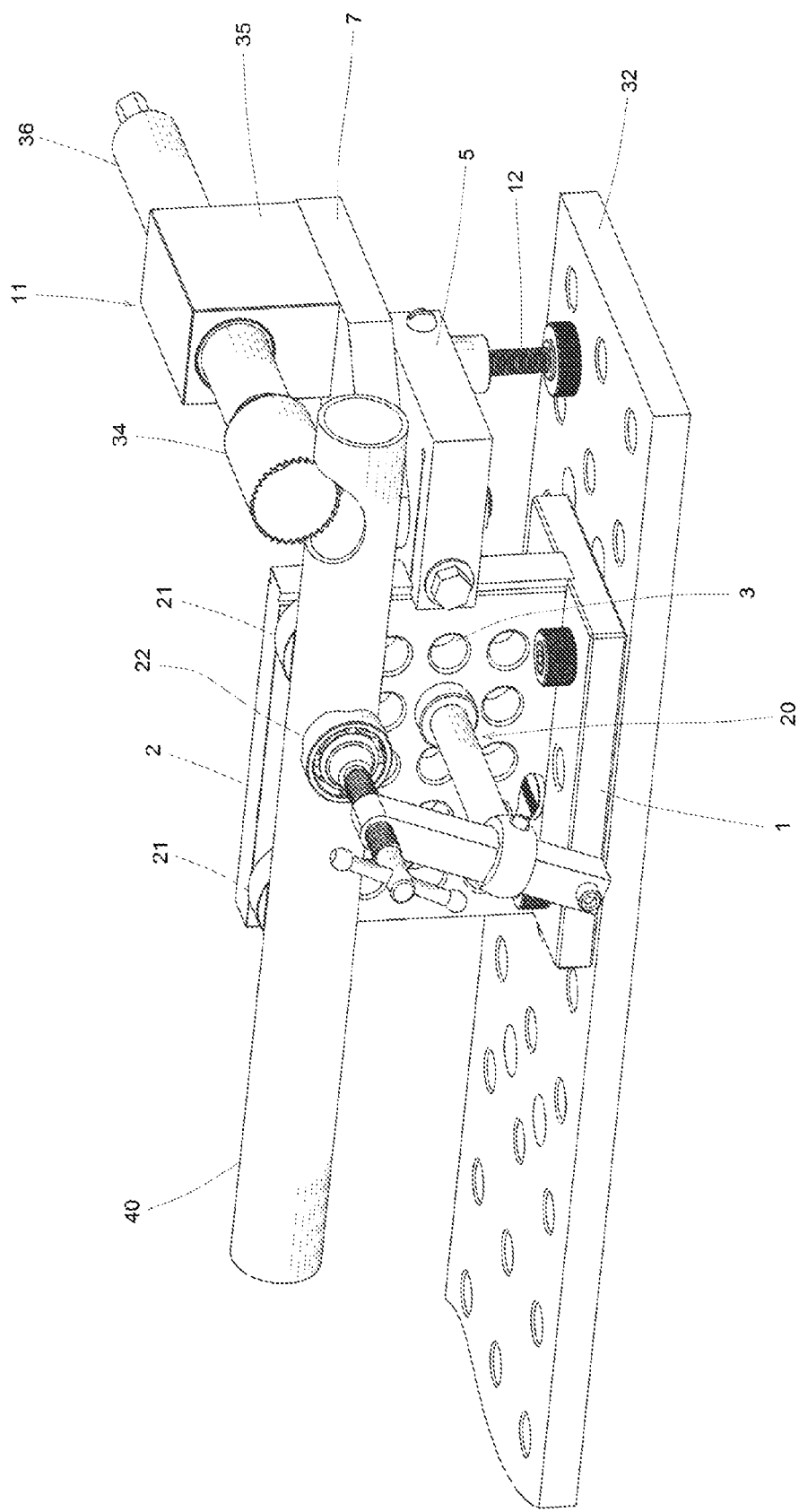
FIG. 4 shows a round tube being held by the T-post clamp for the notcher to make a cut at another location of the round tube as desired.

The T-post clamp 20 has one or more V-pads 21 with indented v-shaped carving on one side for making contact with work piece having curved surface; at the other side of said V-pad 21, there is a cylindrical protrusion that is sized to fit snugly into said tooling holes 3. As shown in FIGS. 3-5, the cylindrical protrusions of the V-pads 21 are placed into the tooling holes 3 on the mounting plate 2; a round tube type work piece is held by the T-post clamp 20 between the V-pads 21 and the magnetic pad 22.

Optionally, V-pads 21 and magnetic pad 22 can be made of die-cast soft metal so that they are less likely to damage the work piece at the contact surface.

Figure 6:
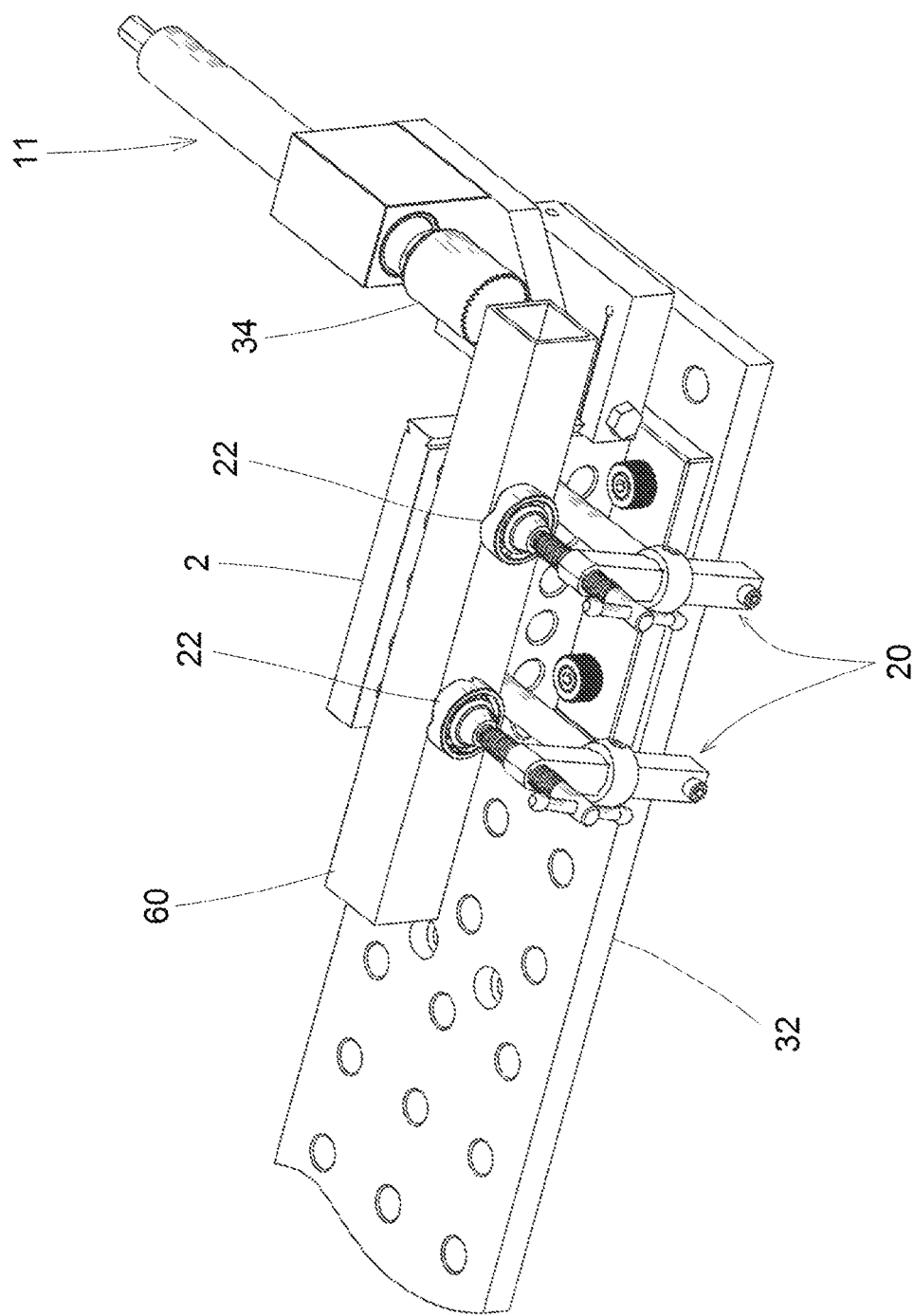
FIG. 6 shows a square tube being held without using V-pads.

In FIG. 6, no V-pad 21 is used when the work piece being held is a square tube. The holding pressure is sufficient by the T-post clamp 20 when pressing the work piece directly against the mounting plate 2 while the notching head 34 is being operated at the desired point as set by a user to notch an opening on the work piece.

The invention claimed is:

1. A notcher, comprising:
a base plate having a plurality of tooling holes;
a mounting plate having a plurality of tooling holes, said mounting plate connected to said base plate in a vertical orientation;
two v-grooves formed to one side of said mounting plate;
a square plate slidably connected to said mounting plate via said v-grooves;
a trapezoidal plate hingeably connected to said square plate via an angle screw;
a notching tool assembly fixed to said trapezoidal plate; and
a height screw attached to said square plate for adjusting the height of the notching tool assembly
wherein the square plate further having a long gap with an opening flanked by two wedges that are coupled to the two v-grooves of the mounting plate, said square plate further having a horizontal tightening screw for tightening the two wedges to the two v-grooves when a desired height of the square plate is set.

2. The notcher of claim 1, wherein the notcher tool assembly further comprised of a shaft held in a through hole in a block, said shaft has a notcher head at one end of said shaft.

3. The notcher of claim 2 further comprising a T-post clamp having a shank, a clamp arm slidably fitted through an end-hole of said shank and a T-handle slidably fitted through a threaded hole of said clamp arm.

4. The notcher of claim 3, wherein said T-handle has a magnetic pad for contacting a work piece, wherein said magnetic pad has indented carvings for contacting work piece with curved surface.

5. The notcher of claim 4 further comprising one or more V-pads with cylindrical protrusion for removably fitting into said tooling holes, wherein said V-pads further having v-shaped carvings for contacting work piece with curved surface.

6. The notcher of claim 5 where the V-pads and the magnetic pad are from die-cast soft metal to minimize causing damages to work pieces.

* * * * *